United States Patent [19]

Balke et al.

[11] Patent Number: 4,565,939
[45] Date of Patent: Jan. 21, 1986

[54] EVERTED KNITTED TUBE INSULATION FOR WINDINGS OF DYNAMOELECTRIC MACHINES

[75] Inventors: Roy L. Balke; Jerome R. Filipowski, both of Erie, Pa.

[73] Assignee: General Electric Company, Salem, Va.

[21] Appl. No.: 641,571

[22] Filed: Aug. 16, 1984

[51] Int. Cl.⁴ .......................... H02K 1/00; H01B 7/00
[52] U.S. Cl. ............................. 310/177; 174/121 SR; 310/179; 310/180; 310/195
[58] Field of Search ................. 310/177–209, 310/215, 45; 174/121 SR, 124 R, 124 G, 124 GC

[56] References Cited

U.S. PATENT DOCUMENTS

| 232,122 | 9/1880 | Hammesfahr | 174/124 G |
| 2,288,695 | 7/1942 | Fuller | 174/121 SR |
| 4,282,284 | 8/1981 | George | 174/121 SR X |
| 4,430,384 | 2/1984 | George | 174/121 SR X |

Primary Examiner—Mark O. Budd
Attorney, Agent, or Firm—Arnold F. Renner

[57] ABSTRACT

A knitted glass fiber tube is everted, or turned inside out to convert the usual outward flare which develops at the cut end thereof into a purse mouth which tends to urge the cut end inward against the peripheral surface of a conductor bar passing therethrough. The intimate contact between the cut end of the everted knitted glass fiber tube and the conductor bar resists deposition of conductive contaminants which may otherwise reduce the insulation provided by the everted knitted glass fiber tube.

12 Claims, 8 Drawing Figures

PRIOR ART

EVERTED KNITTED TUBE INSULATION FOR WINDINGS OF DYNAMOELECTRIC MACHINES

BACKGROUND OF THE INVENTION

The present invention relates to dynamoelectric machines and, more particularly, to techniques for insulating the windings of dynamoelectric machines.

Dynamoelectric machines of medium to large size employ metallic conductor bars inserted into slots in metallic rotors or stators. Some such conductor bars operate in a dirty environment which can provide an unwanted conductive path between adjacent metallic conductor bars when they are operated at substantially different voltages. Although the present invention is not limited to such applications, the problem of maintaining insulation integrity becomes particularly severe in the armatures of DC motors where environmental contaminants, as well as conductive carbon dust produced by the unavoidable wear of carbon brushes may be deposited on parts within the DC motor, including the conductor bars and their insulation.

Medium to large DC motors may employ sets of two or more conductor bars in a single slot in a metallic rotor. Each of the conductor bars in a slot must be insulated from all other conductor bars in the slot. The bars must also be insulated from electrical contact with the metallic rotor. As the bars emerge from the end of the slot, they enter an end turn region wherein they are each bent at an angle with respect to the rotor slot. At the outboard end of the end turn region, the bars are stripped to form lead ends for electrical connection to the remainder of the electrical circuit. The bars diverge slightly in the end turn region, particularly in the vicinity of the lead ends, and thus create a crevice therebetween which is conductive to the collection of carbon and other conductive dust which may become mixed with water or oil to form an adhering conductive layer on and between the conductor bars.

In order to improve the insulation in the vicinity of the transition from the end turn region to the lead end region, it is conventional to wrap this transition of each conductor bar with a woven glass fiber tape and to vacuum impregnate the glass fiber tape with an insulating resin forming the bundle making up the several conductors and inserting them into a single slot in the rotor. The glass fiber tape is conventionally applied by hand using relatively skilled labor. This taping operation represents a significant cost in motor manufacturing and rebuilding.

One technique for insulating conductors includes an insulating tube which may be slipped over the end of the conductor and may then be impregnated with a resin. The use of such insulating tubing for insulating electrical conductors is disclosed in U.S. Pat. Nos. 702,725 and 424,575, among others. Conventional tubing is formed by braiding a large number of individual strands to form a tube. However, conventional braided fabric tubing tends to fray at its cut end unless coated with an unacceptably thick coating of a retaining resin. Fraying at the cut end of the braided fabric tube is quite well illustrated in FIGS. 1 and 2 of the above-referenced '725 patent. Such frayed ends provide a favorable environment for the deposition of conductive contaminants and electrical bridging between adjacent conductors, thereby seriously degrading the insulation provided by the tube.

Braided tubing is relatively expensive because of the large factory space and labor required for its production. Insulating tubing may be produced by the more economical knitting process. Although a knitted tubing resists fraying, the cut end therof generally curves outward to produce a bell-mouth effect which provides a hospitable environment for the deposition of conductive contaminants between the cut end adjacent conductor bars. In addition, the thread gauge, stitch spacing and row spacing in conventional knitted tubing provides a rough surface which is far from optimum in its ability to resist the deposition of a contaminant layer thereon. For these reasons, conventional knitted tubing is not satisfactory for insulating the recited areas of conductor bars on DC motor rotors.

OBJECTS AND SUMMARY OF THE INVENTION

Accordingly, it is an object of the invention to provide an insulating tube for insulating at least a portion of conductor bars in a dynamoelectric machine which overcomes the drawbacks of the prior art.

It is a further object of the invention to provide a knitted insulating tube for insulating at least a portion of conductor bars in a dynamoelectric machine which inherently lies flat against the conductor bars over which it is installed to resist the deposition of conductive contaminants on the insulating tube.

It is a still further object of the invention to provide a knitted insulating tube which inherently lies flat against a conductor over which it is installed and which is capable of withstanding a substantial temperature.

It is a further object of the invention to provide a knitted insulating tube for insulating a portion of a conductor bar wherein the knitted insulating tube has a smooth external surface effective to resist the build-up of a contaminant coating thereon.

It is a further object of the invention to provide a knitted insulating tube for insulating a portion of a conductor bar that is conducive to impregnation by a curable insulating resin.

Briefly stated, the present invention provides a knitted glass fiber tube which is everted, or turned inside out, to convert the usual outward flare which develops at the cut end thereof into a purse mouth which tends to urge the cut end inward against the peripheral surface of a conductor bar passing therethrough. The intimate contact between the cut end of the everted knitted glass fiber tube and the conductor bar resist deposition of conductive contaminants which may otherwise reduce the insulation provided by the everted knitted glass fiber tube.

According to an embodiment of the invention, there is provided an apparatus for insulating a conductor bar comprising a knitted fabric tube, a cut end on the knitted fabric tube, the knitted fabric tube being everted to provide a purse mouth at the cut end, the knitted fabric tube being slipped over the conductor bar with an end of the conductor bar protruding therefrom and the purse mouth being effective to urge the cut end toward the conductor bar whereby a close fit is obtained between the cut end and the conductor bar.

According to a feature of the invention, there is provided an insulated conductor bar comprising a metallic conductor bar, a knitted sleeve of a glass fabric cloth, a cut end on the knitted sleeve, the knitted sleeve being everted to provide a purse mouth on the cut end, the knitted sleeve being closely fittable over the metallic conductor bar with at least a portion of the metallic conductor bar extending from the cut end, the purse mouth being effective for urging the cut end into contact with a peripheral surface of the conductor bar and a cured curable insulating resin impregnating the knitted sleeve.

According to a further feature of the invention, there is provided a half turn assembly for a DC electric motor comprising at least first and second metallic conductors each of the first and second metallic conductors including a slot portion, a first end portion and a second end turn portion at opposed ends of the slot portion, a first lead end at a distal end of the first end turn portion and a second lead end at a distal end of the second end turn portion, at least a first contiguous region of the first end turn and the first lead end on at least one of the at least first and second metallic conductors having a closely fitting knitted glass cloth sleeve fitted thereover with a portion of the first lead end passing outward past a cut end of the knitted glass cloth sleeve, the knitted glass cloth sleeve being everted before being installed on at least one of the at least first and second metallic conductors whereby a purse mouth is formed on the cut end which is effective to urge the cut end into close-fitting contact with a peripheral surface of the portion of the first lead end, means for mutually insulating slot portions of the at least first and second metallic conductors, means for combining the slot portions of the at least first and second metallic conductors for insertion into a slot and the knitted glass cloth sleeves, the means for mutually insulating and the means for combining being impregnated with a cured curable insulating resin.

According to a still further feature of the invention, there is provided a method for insulating a metallic conductor bar comprising knitting a glass fiber sleeve having an internal dimension closely fitting an outside dimension of the metallic conductor bar, everting the glass fiber sleeve to provide a purse mouth at a cut end thereof, inserting the metallic conductor bar into the glass fiber sleeve with an end thereof extending outward past the cut end, the purse mouth being effective for urging the cut end into close-fitting contact with a peripheral surface of the metallic conductor bar, and impregnating the glass fiber sleeve with a curable insulating resin and curing the curable resin.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The knitted sleeve insulation techniques disclosed herein may have general applicability for insulating any conductor or non-conductor in which a close fit between a cut end of the sleeve and the conductor passing therefrom is of interest. For concreteness of description, however, an application of the invention directed to the insulation of the vicinity of the interface of the end turns and the lead ends of a medium to large DC motor is shown and described.

Figure 1:
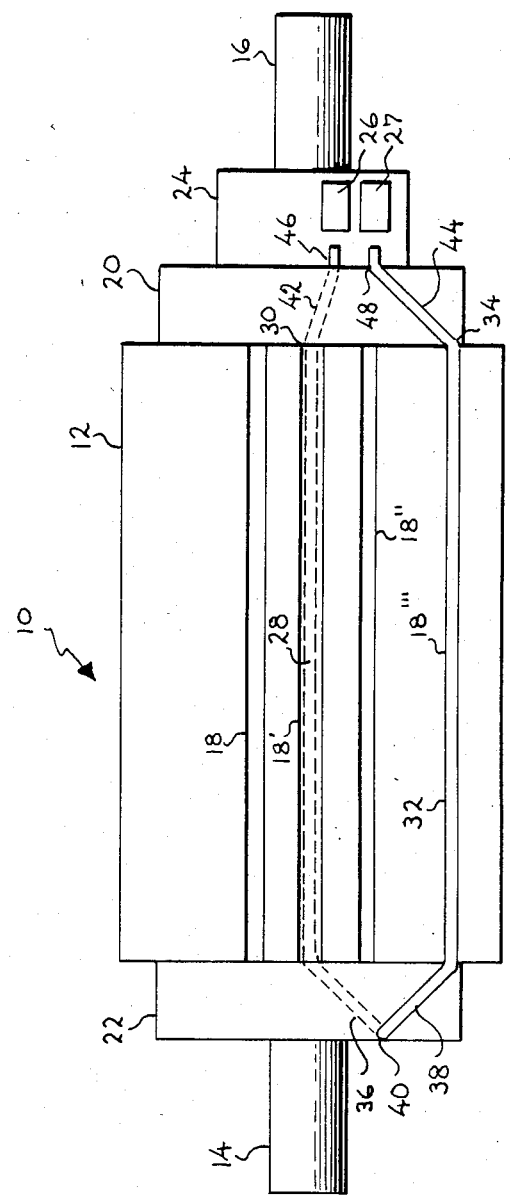
FIG. 1 is a simplified top view of a rotor of a DC motor in which the insulating tube of the present invention may be used.

Referring first to FIG. 1, an overall view of the environment within which the present invention must perform is shown. A rotor 10 includes a cylindrical rotor core 12 of ferromagnetic material supported on shafts 14 and 16. Rotor core 12 includes a plurality of slots 18 parallel to an axis of shafts 14 and 16 uniformly spaced about the surface of rotor core 12. In order to avoid unnecessary clutter which would interfere with an understanding of the invention, only four of the much larger number of slots 18 within rotor core 12 are illustrated in FIG. 1. An end-turn region 20 is disposed contiguous to one end of rotor core 12. End-turn region 20 has a diameter substantially smaller than the diameter of rotor core 12. A similar end-turn region 22 is disposed contiguous to the opposed end of rotor core 12. A commutator 24 is disposed contiguous to an outboard end of end-turn region 20.

At any instant of time during operation of rotor 10, pairs of carbon brushes (not shown) apply driving DC electrical power to opposed ends of one or more turns of conductors set into spaced-apart ones of slots 18. Reference may be made to any one of numerous college texts on DC machinery for a more complete discussion of the use of carbon brushes in contact with a commutator to apply power to turns of conductors in a rotor of a DC motor. For present purposes, it is sufficient to identify two brush footprints 26 and 27 which represent the instantaneous points of conductive contact of two of a set of brushes (the other brushes are not shown) which may be employed. A slot portion 28 of a lower half turn 30, shown in dashed line, is disposed in the bottom of a slot 18'. A slot portion 32 of an upper half turn 34 is disposed in a slot 18'''. Each slot 18, 18', 18'', and 18''' has a depth sufficient to receive a slot portion 28 in the bottom thereof as well as a slot portion 32 atop it. That is, a complete set of slot portions 28 is disposed about the circumference of rotor core 12, one at the bottom of each slot 18, and a complete set of slot portions 32 is disposed about the circumference of rotor core 12, one in each slot 18 atop a slot portion 28 lying below it.

An end turn 36 of lower half turn 30 is inclined in a first direction over end-turn region 22. An end turn 38 of upper half turn 34 is inclined in the opposite direction over end-turn region 22 whereby end turn 36 and end turn 38 meet at a connection 40. In some designs of rotor 10, lower and upper half turns 30 and 34 are formed with an integral connection between their end turns 36 and 38 at connection 40. In other designs of rotor 10, lower half turn 30 and upper half turn 34 are formed as separate elements which are joined at connection 40 after installation thereof in their respective slots 18. In the latter case, both ends of lower half turn 30 and upper half turn 34 may be identical to each other. That is, the insulating technique employed at one end of lower half turn 30, for example, may be substantially identical to the insulating technique employed at the other end thereof. Due to the identical nature of the insulation techniques at the opposed ends, only the insulation at the end adjacent commutator 24 is shown and described in detail, it being understood that the second end receives identical treatment.

At the commutator end of rotor 10, lower half turn 30 includes an end turn 42 inclined in a first direction. Upper half turn 34 includes an end turn 44 inclined in the opposite direction. An outboard end of end turn 42 terminates in a lead end 46. Similarly, an outboard end of end turn 44 terminates in a lead end 48. Lead ends 46 and 48 are respectively connected by conventional means to segments (not shown) on commutator 24 which are electrically contacted by brush footprints 26 and 27. One skilled in the art would recognize that, if a potential difference is maintained between the commutator segments contacted by brush footprints 26 and 27, an electric current will flow through the conductive loop or turn provided by lower and upper half turns 30 and 34. The magnetic field produced in rotor core 12 by the current flowing in the conductive turn is employed to produce a rotational torque effective to rotate rotor 10, as is well known. As rotor 10 rotates the segments of commutator 24 slide under brush footprints 26 and 27 to energize successive corresponding lower and upper half turns 30 and 34 as necessary to maintain unidirectional rotation of rotor 10.

Lower and upper half turns 30 and 34 may have numerous configurations without departing from the scope and spirit of the invention. In the embodiment of FIG. 1, a single conductor in each of slot portions 28 and 32 is employed to conduct the current through slots 18' and 18'''. In addition to the single-conductor system, multiple-conductor versions of lower and upper half turns 30 and 34 may employ two or more mutually insulated conductors in slots 18' and 18'''. Each conductor is individually connected to a commutator segment, as will be described.

Figure 2:
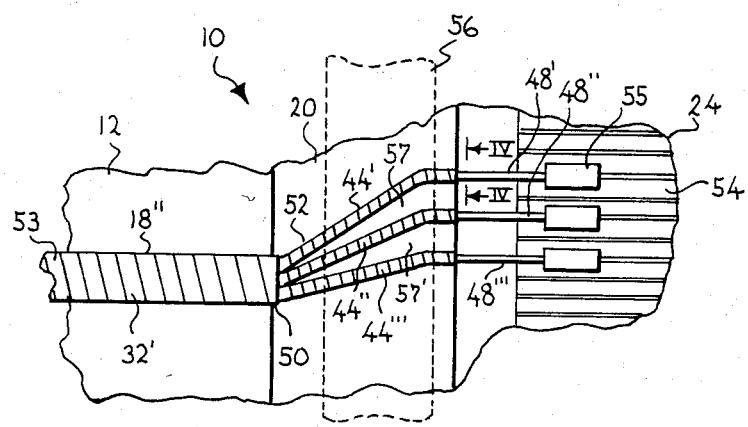
FIG. 2 is a close-up view of a portion of the rotor of FIG. 1 showing the insulating method according to the prior art.

Referring now to FIG. 2, an upper half turn assembly 50, according to the prior art, is shown in which a slot portion 32' contains three mutually insulated conductors fitted into slot 18''' in rotor core 12. Three separate end turns 44', 44'' and 44''' of the mutually isolated conductors diverge from slot portion 32'. Each of end turns 44', 44'' and 44''' (end turn 44' is used as an example representing all three) is wrapped over substantially its entire length with a fabric tape wrapping 52 which may be, for example, a glass fiber woven tape having a width of about 0.75 inch and a thickness of about 4 mils. The woven tape is half lapped and is either prepregged or is impregnated after winding with a curable resin such as, for example, a heat-curable epoxy resin. For ease of handling and inserting into slot 18''', and for protection from abrasion by slot 18''', the three conductors within slot portion 32', conventionally mutually insulated by a continuation of fabric tape wrapping 52, are wrapped together by an outer wrapping 53 which may be of the same type of glass fiber woven tape as fabric tape wrapping 52 and may be wound, impregnated and cured in the same manner as fabric tape wrapping 52.

Each end turn 44, as well as each end turn 42 of lower half turn 30 (see FIG. 1), is electrically and mechanically connected to a riser (not shown) extending outward from one conductor bar 54 of end-turn region 20 using a connector clip 55. Final connection of lead ends 46 (FIG. 1) and lead ends 48 with respective connector clips 55 is conventionally accomplished using inert-gas welding such as, for example, tungsten-inert-gas welding (TIG). The welding operation, which is performed on wrapped and cured conductor bars, raises the temperature of the metal to its melting temperature. Conduction from the welding zone to the insulated portions may raise the temperature in the vicinity of the insulated portions to about 200–300 degrees C. The need to resist such temperatures without significant degradation serves as the basis for selection of a glass fiber material in the insulating material. The rotational speed of rotor 10 exerts a centrifugal force on end turns 42 (FIG. 1) and end turns 44 which, if not resisted, may deform such elements outward. In order to resist radially outward deformation of the elements in end-turn region 20, a band 56, shown in dashed line, of a suitable strong, non-conductive, material is wrapped over end-turn region 20 and the elements upon it. The separation of end turn 44' and end turn 44'' taking place beneath band 56 provides a quiet region 57 within which build-up of conductive contaminants may be expected. A similar quiet region 57' is formed under band 56 between end turns 44'' and 44''' and between all other adjacent end turns 44 and end turns 42 (FIG. 1). Thus, additional insulation in these quiet regions is conventionally provided.

Figure 3:
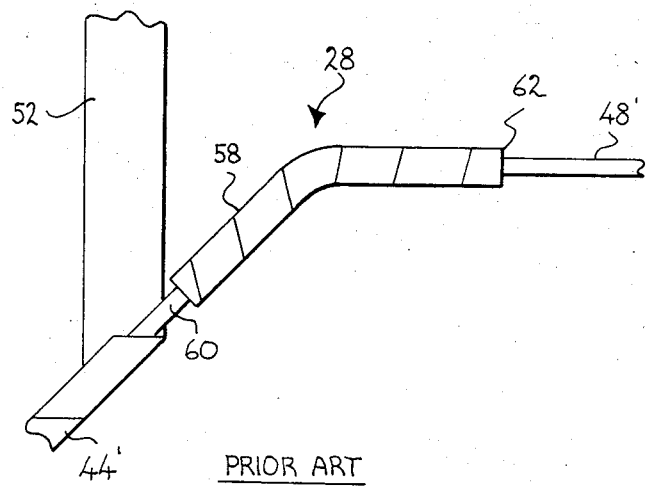
FIG. 3 is a close-up view of a connecting portion of a half turn of FIG. 2 according to the prior art.

Referring now to FIG. 3, a close-up view of a portion of slot portion 28 in the vicinity of the transition between lead end 48' and end turn 44' is shown, with fabric tape wrapping 52 partly unwrapped to reveal an end-turn wrapping 58 which overlaps a portion of an end-turn conductor bar 60 and a portion of lead end 48'. End-turn wrapping 58 may use the same type of tape, impregnation and curing as fabric tape wrapping 52. Once end-turn wrapping 58 is in place, fabric tape wrapping 52 is wrapped over it to provide an additional thickness of tightly bound insulation extending along lead end 48'. It is important that an outer end 62 of end-turn wrapping 58 tightly conform to the surface of lead end 48' at all times, especially after curing and the final welding operation and curing of the impregnating resin.

Figure 4:
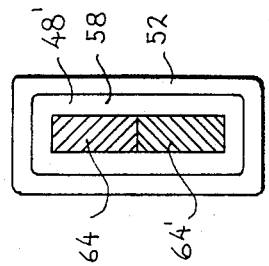
FIG. 4 is a cross section of a conductor bar taken along IV—IV of FIG. 2.

Referring now to FIG. 4, it will be noted that each of the conductors, including lead ends 48', is conventionally made of two or more parallel conductors 64 and 64' in order to improve the flexibility of lower and upper half turns 30 and 34. The overall cross section of lead end 48' is rectangular, conventionally with a large height compared to its thickness. A long and thin cross-sectional shape is difficult to cover with a wrapping which conforms closely to the surface, particularly along the long height dimension.

As noted in the discussion of the background of the invention, end-turn wrapping 58 and fabric tape wrapping 52 are applied by hand using relatively skilled labor. If the wrapping operations required for installation of at least one of these elements could be eliminated, a desirable reduction in the quantity and quality of labor required for performing this portion of the manufacture would be possible. One possibility for simplifying the installation of insulation on lead end 48' and end-turn conductor bar 60 (FIG. 3), as well as on the remainder of the conductor bars, consists of the substitution of a tube of a suitable fabric material which is simply slipped over the end of lead end 48' and slid into position. The advantages of such a substitution have heretofore been substantially impaired by certain properties of conventional fabric tubes.

Figure 5:
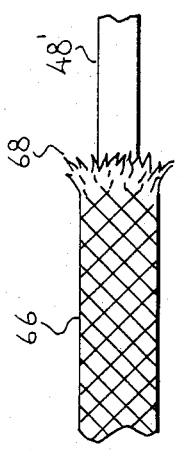
FIG. 5 is a side view of a conductor bar covered with a woven sleeve according to the prior art.

Conventional fabric tubes are either woven or knitted. FIG. 5 illustrates a woven fabric tube 66 disposed on lead end 48'. A cut end 68 of woven fabric tube 66 tends to fray as shown. The fraying is progressive with handling of woven fabric tube 66 before and during impregnation and curing. The fraying at cut end 68 prevents a tight fit between cut end 68 and lead end 48' and thus permits the deposition of bridging conductive contaminants thereon.

A conventional knitted faric tube does not tend to fray as does woven fabric tube 66. In addition, a knitted fabric tube may exhibit a cost advantage over woven fabric tube 66 since the process for its production may be faster and require less space and labor. However, a knitted fabric tube has another drawback which customarily obviates its use as an insulation in the apparatus described herein.

Figure 6:
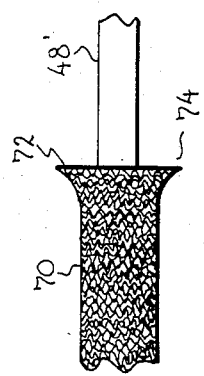
FIG. 6 is a side view of a conductor bar covered with a knitted sleeve according to the prior art.

Referring now to FIG. 6, a conventional knitted tube 70 is shown fitted over lead end 48'. A cut end 72 of conventional knitted tube 70 exhibits an outward flare bell mouth 74 which prevents a tight fit between cut end 72 of conventional knitted tube 70 and the peripheral surfaces of lead end 48'.

Figure 7:
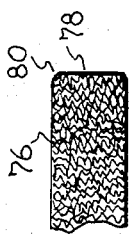
FIG. 7 is a side view of an everted knitted sleeve according to an embodiment of the invention.

Referring now also to FIG. 7, an everted knitted tube 76 is produced when conventional knitted tube 70 of FIG. 6 is everted, or pulled inside out in a manner similar to the way a sock is pulled inside out when it is removed from the foot. Everted knitted tube 76 overcomes the undesirable properties of conventional knitted tube 70 thus making it a candidate for use in at least portions of the insulation tasks outlined above. A cut end 78 of everted knitted tube 76, instead of being bell-mouthed as was the case in conventional knitted tube 70 (FIG. 6), is contracted inward to form a purse mouth 80.

Figure 8:
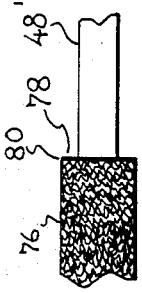
FIG. 8 is a side view of the everted knitted sleeve of FIG. 7 in place on a conductor bar.

Referring now also to FIG. 8, when everted knitted tube 76 is slipped over lead end 48', purse mouth 80 tends to urge cut end 78 into intimate contact with the peripheral surface of lead end 48' and resiliently retain it there, rather than urge it away. We have discovered that an intimate contact is achievable at cut end 78 using everted knitted tube 76 and that, using a properly selected material, the intimate contact survives the subsequent operations of impregnation, welding and curing. Eversion of everted knitted tube 76 may be performed either on the knitting machine or after the tube is removed from the knitting machine. Eversion on the knitting machine does not require a substantial labor input to accomplish and is thus the preferred method.

In one embodiment of the invention, a conductor bar is covered by an everted knitted tube 76 having a circular internal diameter of from about 0.229 to about 0.249 inch with a wall thickness of about 0.021 inch. A typical conductor bar made up of conductors 64 and 64' for use with everted knitted tube 76 may have a cross sectional width of about 0.05 inch and a combined cross sectional height of about 0.4 inch. This corresponds to a circular member having a diameter of about 0.28 inch. Thus, everted knitted tube 76 is stretched as it is slipped over the conductor bar. Such stretching aids in achieving a tight fit. In the preferred embodiment, everted knitted tube 76 is stretched from about 3 to about 20 percent as it is slipped over the conductor bar. In the most preferred embodiment, everted knitted tube 76 is stretched from about 5 to about 15 percent as it is slipped over the conductor bar.

A glass fiber thread having a diameter of from about 0.012 to about 0.014 inch is knitted at about 30 stitches per inch and about 22 rows per inch to provide, not only satisfactory contact with the conductor bar, but also an exterior surface having sufficient smoothness to discourage adhesion of conductive contaminants thereto. Other sizes of conductor bars would, of course, require appropriate changes in dimensions of everted knitted tube 76. Other requirements may encourage a change in thread size, stitches per inch and rows per inch, but such changes should not be construed to remove the resulting everted knitted tube 76 from the scope of the present invention.

A knitted glass fiber tube suitable for use in everted knitted tube 76 is commercially available from Bentley Harris Corporation under the designation ExFlex-K. The above knitted glass fiber tube may be obtained either everted on non-everted.

Referring again to FIG. 3, we have obtained satisfactory results using an everted knitted tube 76 to replace end-turn wrapping 58 while retaining fabric tape wrapping 52 wound thereover. In addition, the use of everted knitted tube 76 covering the entire length of slot portion 28, except for lead end 48' and connection 40 (FIG. 1), appears to be desirable in certain applications. In the latter instance, fabric tape wrapping 52 may be omitted, or retained, as required by the application. If fabric tape wrapping 52 is omitted entirely, an even greater cost saving may be realized.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for insulating a conductor bar comprising:
   a knitted fabric tube;
   a cut end on said knitted fabric tube;
   said knitted fabric tube being everted to provide a purse mouth at said cut end;
   said knitted fabric tube being slipped over said conductor bar with an end of said conductor bar protruding therefrom; and
   said purse mouth being effective to urge said cut end toward said conductor bar whereby a close fit is obtained between said cut end and said conductor bar.

2. Apparatus according to claim 1 further comprising a curable resin impregnating said knitted fabric tube.

3. Apparatus according to claim 2 wherein said curable resin is cured.

4. An insulated conductor bar comprising:
   a metallic conductor bar;
   a knitted sleeve of a glass fabric cloth;
   a cut end on said knitted sleeve;
   said knitted sleeve being everted to provide a purse mouth on said cut end;
   said knitted sleeve being closely fittable over said metallic conductor bar with at least a portion of said metallic conductor bar extending from said cut end;
   said purse mouth being efffective for urging said cut end into contact with a peripheral surface of said conductor bar; and a cured curable insulating resin impregnating said knitted sleeve.

5. An insulated conductor bar according to claim 4 wherein said knitted sleeve covers substantially an entire length of said metallic conductor bar except for first and second portions thereof extending from first and second cut ends of said knitted sleeve.

6. An insulated conductor bar according to claim 4 wherein said knitted sleeve includes first and second spaced-apart knitted sleeves covering first and second spaced-apart portions of said conductor bar and said insulated conductor bar further includes a fabric tape wrapping of a glass fiber tape covering at least a portion of each of said first and second sleeves and substantially an entire portion of said conductor bar therebetween, and said fabric tape wrapping includes an impregnation of a cured curable insulating resin.

7. An insulated conductor bar according to claim 1 wherein said knitted fabric tube includes an unstretched inner diameter and said unstretched inner diameter is stretched from about 3 to about 20 percent when slipped over said conductor bar.

8. An insulated conductor bar according to claim 7 wherein said unstretched inner diameter is stretched from about 5 to about 15 percent when slipped over said conductor bar.

9. A half turn assembly for a DC electric motor comprising:

at least first and second metallic conductors;

each of said first and second metallic conductors including a slot portion, a first end turn portion and a second end turn portion at opposed ends of said slot portion, a first lead end at a distal end of said first end turn portion and a second lead end at a distal end of said second end turn portion;

at least a first contiguous region of said first end turn and said first lead end on at least one of said at least first and second metallic conductors having a closely fitting knitted glass cloth sleeve fitted thereover with a portion of said first lead end passing outward past a cut end of said knitted glass cloth sleeve;

said knitted glass cloth sleeve being everted before being installed on said at least one of said at least first and second metallic conductors, whereby a purse mouth is formed on said cut end which is effective to urge said cut end into close-fitting contact with a peripheral surface of said portion of said first end lead;

means for mutually insulating slot portions of said at least first and second metallic conductors;

means for combining said slot portions of said at least first and second metallic conductors for insertion into a slot; and said knitted glass cloth sleeves, said means for mutually insulating and said means for combining being impregnated with a cured curable insulating resin.

10. A half turn assembly according to claim 9 wherein said means for mutually insulating includes a fabric tape wrapping at least partially overlapping each of said knitted glass cloth sleeves on said at least first and second metallic conductors and covering substantially all of said at least first and second metallic conductors therebetween.

11. A half turn assembly according to claim 10 wherein said means for combining includes a fabric tape wrapping over at least a substantial part of slot portions of said at least first and second metallic conductors.

12. A half turn assembly according to claim 9 wherein said means for mutually insulating includes a continuation of said knitted glass cloth sleeve from at least one of said lead ends to cover substantially all of said slot portion of one of said at least first and second metallic conductors.

* * * * *